United States Patent
Sobel et al.

(10) Patent No.: US 11,940,272 B2
(45) Date of Patent: Mar. 26, 2024

(54) PULSED EDDY CURRENT SYSTEM

(71) Applicant: ABB Schweiz AG, Baden (CH)

(72) Inventors: Jarl Sobel, Bagarmossen (SE); Martin Zlatanski, Küsnacht (CH)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 18/255,993

(22) PCT Filed: Sep. 21, 2021

(86) PCT No.: PCT/EP2021/075906
§ 371 (c)(1),
(2) Date: Jun. 5, 2023

(87) PCT Pub. No.: WO2022/122207
PCT Pub. Date: Jun. 16, 2022

(65) Prior Publication Data
US 2024/0044635 A1    Feb. 8, 2024

(30) Foreign Application Priority Data
Dec. 11, 2020    (EP) ..................... 20213460

(51) Int. Cl.
*G01B 7/06*    (2006.01)
(52) U.S. Cl.
CPC ..................... *G01B 7/10* (2013.01)
(58) Field of Classification Search
CPC ............. G01B 7/10; G01B 7/02; G01N 27/72
See application file for complete search history.

(56) References Cited

U.S. PATENT DOCUMENTS

| | | | |
|---|---|---|---|
| 4,651,093 A | 3/1987 | Detriche et al. |
| 4,717,006 A | 1/1988 | Chapman et al. |
| 5,059,902 A | 10/1991 | Linder |
| 5,498,958 A | 3/1996 | Tu et al. |

(Continued)

FOREIGN PATENT DOCUMENTS

| | | |
|---|---|---|
| DE | 4337504 A1 | 5/1995 |
| DE | 102014218255 A1 | 3/2016 |

(Continued)

OTHER PUBLICATIONS

PCT International Search Report and Written Opinion of the International Searching Authority; Application No. PCT/EP2021/075906; Completed: Dec. 2, 2021; dated Dec. 13, 2021; 14 Pages.

*Primary Examiner* — Jay Patidar
(74) *Attorney, Agent, or Firm* — Whitmyer IP Group LLC

(57) ABSTRACT

The present disclosure relates to a transmitter for a Pulsed Eddy Current system, configured to generate a changing electromagnetic field which induces eddy currents in an object of an electrically conductive material arranged within the electromagnetic field. The transmitter includes a switching device and a transmitter coil configured to be connected to a voltage source. The switching device is arranged for switching a current generated by the voltage source through the transmitter coil. The transmitter coil comprises a plurality of parallel electrically conductive coil layers with a respective damping resistor connected across each of the coil layers, each of the coil layers being connected in series with a respective diode.

16 Claims, 2 Drawing Sheets

(56) References Cited

U.S. PATENT DOCUMENTS

| | | | |
|---|---|---|---|
| 6,661,224 | B1 | 12/2003 | Linder |
| 7,075,304 | B2 * | 7/2006 | Nelson .................. G01V 3/104 |
| | | | 324/329 |
| 7,148,681 | B2 | 12/2006 | Johnson et al. |
| 7,148,691 | B2 | 12/2006 | Nelson et al. |
| 9,103,802 | B2 | 8/2015 | Linder et al. |

FOREIGN PATENT DOCUMENTS

| | | | |
|---|---|---|---|
| EP | 117790 | A1 | 9/1984 |
| EP | 3182113 | A1 | 6/2017 |

* cited by examiner

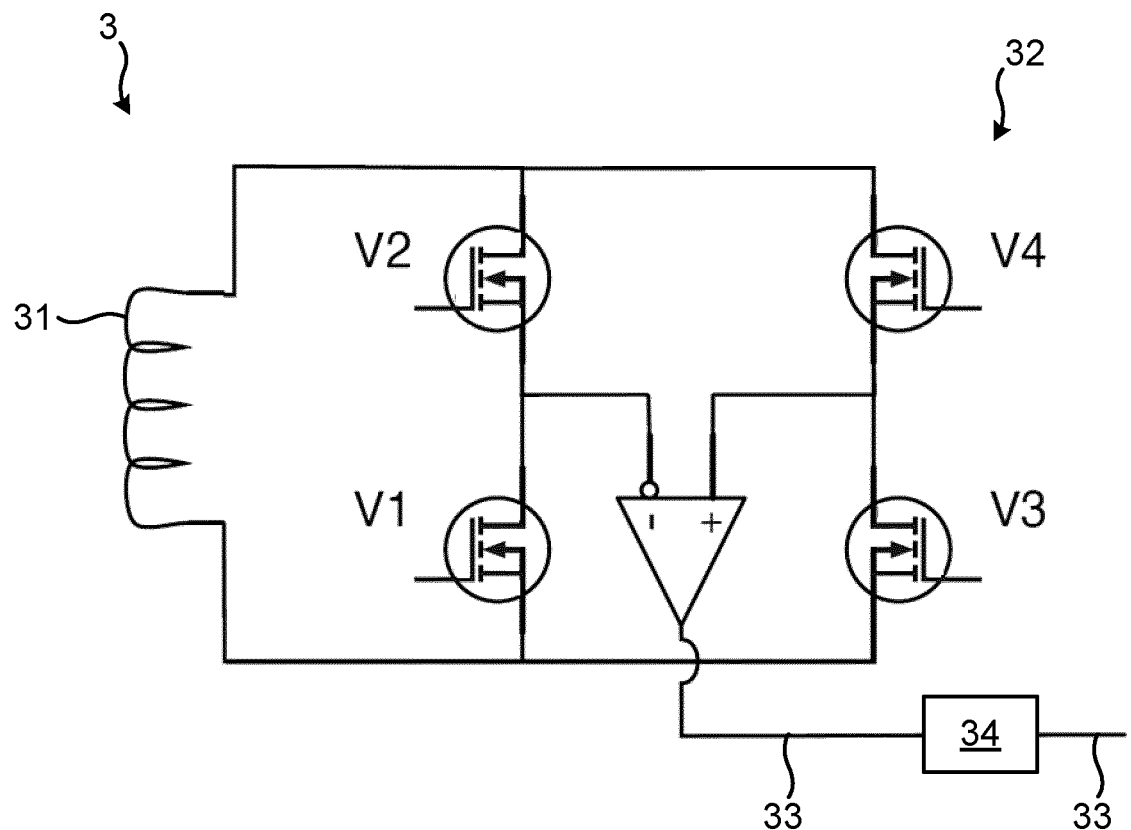
Fig. 3
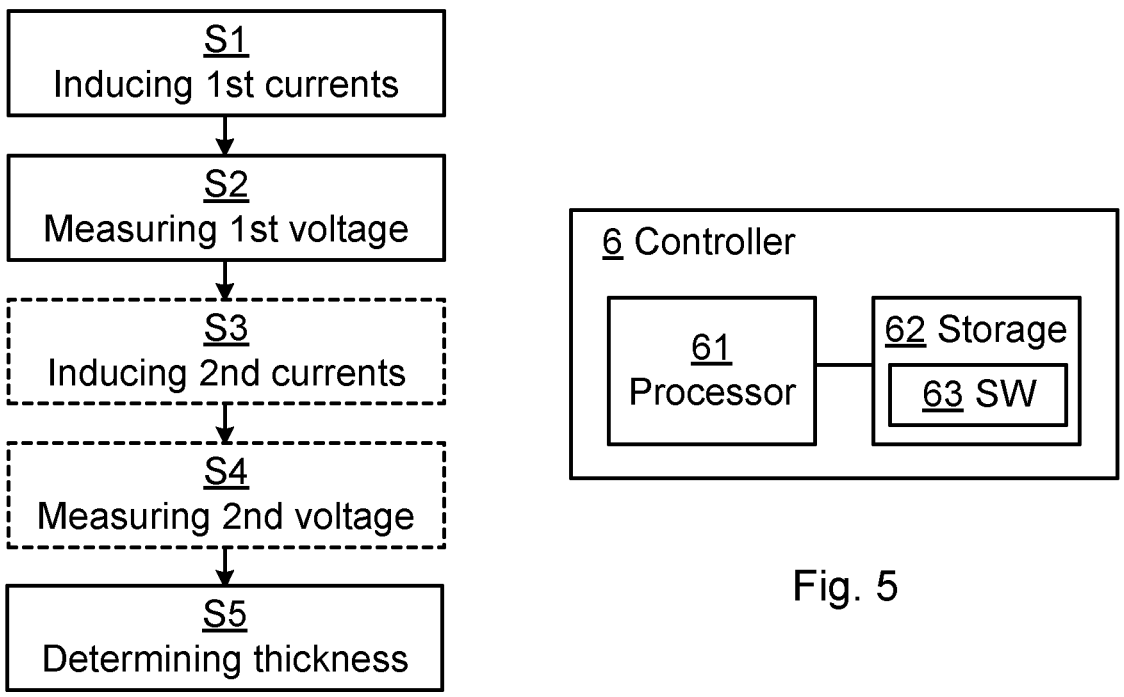
Fig. 4
Fig. 5

PULSED EDDY CURRENT SYSTEM

TECHNICAL FIELD

The present disclosure relates to a Pulsed Eddy Current (PEC) system comprising a transmitter configured to generate a changing electromagnetic field which induces eddy currents in an object of an electrically conductive material arranged within the electromagnetic field, and a receiver configured to detect a changing electromagnetic field generated by the eddy currents.

BACKGROUND

PEC, e.g. as described in U.S. Pat. No. 5,059,902, has been successfully applied to the measurement of mechanical quantities, such as electrical resistivity, thickness of non-ferrous metal sheets and edge position.

The method works by creating a static magnetic field in the plate under measurement using a DC current in a transmitter coil. The magnetic field is then suddenly removed by turning off the current, depositing the magnetic energy in suitable load resistors. The first pulse resulting from the current cut-off is measured and its integral can be used to determine the distance between the plate and the coil.

After the current in the transmitter coil has decayed, it is possible to start a measurement of the eddy currents induced in the plate by the sudden change of the applied magnetic field. The change of magnetic field due to the rapid decay of the eddy currents in the plate can induce a small signal which can be measured and analysed in order to deduce the resistivity and the thickness of the plate.

The measurement of the eddy current signal is usually done using a separate receiver coil and a separate measurement receiver channel (RC), specially designed to measure the mV signal from the eddy current decay. The first pulse resulting from the transmitter current cut-off can be several hundred volts, why the eddy current measurement channel must also include some type of Over Voltage Protection (OVP).

The earliest part of the eddy current decay is independent of the thickness, and can be used to get a measure of the resistivity of the plate. The later part depends on the sheet resistance, so it depends on the resistivity divided by the thickness. After computing the resistivity and the sheet resistance, the thickness of the plate can be deduced, e.g. as described in U.S. Pat. No. 6,661,224.

SUMMARY

It is an objective of the present invention to provide an improved PEC system and method for thickness measurement of thin plates.

It has now been realized that in order to measure the thickness of thin plates, e.g. having a thickness of less than 0.5 mm, there is a need to increase the transmitter current. By means of the present invention, lower thicknesses can be measured with sufficient accuracy, e.g. down to 200 μm thickness. In accordance with the present invention, higher currents and lower capacitance of the transmitter are obtained by a simpler coil system with a single semiconductor switch and parallel diodes (one per coil layer, which also prevents a circulating current from flowing between the coil layers).

According to an aspect of the present invention, there is provided a transmitter for a PEC system. The transmitter is configured to generate a changing electromagnetic field which induces eddy currents in an object of an electrically conductive material arranged within the electromagnetic field. The transmitter comprises a switching device and a transmitter coil configured to be connected to a voltage source. The switching device is arranged for switching a current generated by the voltage source through the transmitter coil. The transmitter coil comprises a plurality of parallel electrically conductive coil layers, connected in parallel to each other, with a respective damping resistor connected across each of the coil layers (i.e. one, meaning only one or at least one, damping resistor per coil layer), each of the coil layers being connected in series with a respective diode (i.e. one, meaning only one or at least one, diode per coil layer).

According to another aspect of the present invention, there is provided a PEC system (e.g. an embodiment of the PEC system of the present disclosure). The PEC system comprises an embodiment of the transmitter of the present disclosure and a receiver configured to detect a changing electromagnetic field generated by the eddy currents, the receiver comprising an electrically conductive receiver coil, a Receiver Channel (RC) and an Over-Voltage Protection circuit (OVP) connected between the receiver coil and the RC.

According to another aspect of the present invention, there is provided a method of determining a thickness of the object by means of an embodiment of the PEC system of the present disclosure. The method comprises, by means of the transmitter, inducing first eddy currents in the object; by means of the receiver, as a function of time, measuring a first voltage having a first polarity in the RC, wherein the first voltage is induced in the receiver coil by the changing electromagnetic field generated by the first eddy currents; and based on the measurement of the first voltage, determining the thickness of the object.

According to another aspect of the present invention, there is provided a computer program product comprising computer-executable components for causing a controller of a PEC system to perform an embodiment of the method of the present disclosure when the computer-executable components are run on processing circuitry comprised in the controller.

The OVP is used for protecting the RC from the initial voltage spike, enabling measurement of the small voltages (mV range) induced by the eddy currents in a stable way. Since the transmission coil of the present invention is unipolar, as a result of the parallel diodes, it may in some applications be desirable to enable the receiver side to be bipolar in order to compensate for any offsets. Thus, in some embodiments of the present invention, the OVP has a bipolar topology, enabling it to be used to switch the polarity of the RC even though the induced eddy currents are always of the same polarity.

It is to be noted that any feature of any of the aspects may be applied to any other aspect, wherever appropriate. Likewise, any advantage of any of the aspects may apply to any of the other aspects. Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated. The use of "first", "second" etc. for different features/components of the present disclosure are only intended to distinguish the features/components from other similar features/components and not to impart any order or hierarchy to the features/components.

BRIEF DESCRIPTION OF THE DRAWINGS

Embodiments will be described, by way of example, with reference to the accompanying drawings, in which:

FIG. 3 is a schematic circuit diagram of an embodiment of the receiver of the present invention.

FIG. 4 is a schematic flow chart of a method in accordance with some embodiments of the present invention.

FIG. 5 is a schematic block diagram of a controller in accordance with some embodiments of the present invention.

DETAILED DESCRIPTION

Embodiments will now be described more fully hereinafter with reference to the accompanying drawings, in which certain embodiments are shown. However, other embodiments in many different forms are possible within the scope of the present disclosure. Rather, the following embodiments are provided by way of example so that this disclosure will be thorough and complete, and will fully convey the scope of the disclosure to those skilled in the art. Like numbers refer to like elements throughout the description.

Figure 1:
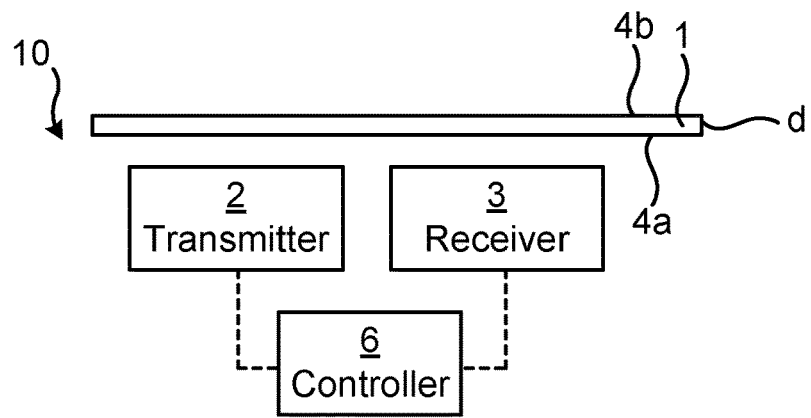
FIG. 1 is a schematic block diagram of an embodiment of the PEC system of the present invention.

FIG. 1 illustrates an embodiment of a PEC system 10 arranged for measuring the thickness d of an object 1, typically a plate (which may also be called sheet metal) of a non-ferrous electrically conducting material such as Al, the object having a first (here lower) side 4a and a second (here upper) side 4b. In the figure, the object 1 in the form of a plate has a longitudinal axis which is perpendicular to the plane of the figure.

The PEC system 10 comprises a transmitter 2 and a receiver 3. In the figure, both of the transmitter 2 and the receiver 3, specifically the transmitter coil and receiver coil, respectively, thereof are arranged on the same side of the object 1, which is preferred in some embodiments. However, in some other embodiments, the receiver coil may be arranged on the opposite side of the object 1 in relation to the transmitter coil.

The PEC system 10 may comprise a controller 6 for controlling the transmitter 2 and the receiver 3 via control signalling e.g. as illustrated by the dashed lines in the figure. The controller may be formed as a separate device, or be partly or fully integrated with the transmitter and/or receiver. The controller 6 may e.g. comprise a central controller device which is arranged separate from the transmitter and receiver and distributed controller device(s) integrated with the transmitter and/or receiver.

The speed with which it is possible to turn off the transmitter current depends on the time constant of the coil system used. The time constant of a coil system is proportional to $\sqrt{LC}$, where L is the effective inductance of the coil system, and C is its effective capacitance. The effective capacitance includes the distributed capacitance of the coil system and the capacitance of the attached electronics.

In order to get information of the resistivity of the electrically conductive object 1, e.g. a non-ferrous plate such as an aluminium (Al) plate, it may be convenient to perform a measurement before the change in the magnetic field has had time to penetrate the object/plate. This occurs on a time scale equal to $$T_{plate} = \frac{d^2 \mu_0}{\pi^2 \rho},$$

where d is the plate thickness, $\rho$ its resistivity, and $\mu_0$ the magnetic permeability of free space.

The condition that the time constant of the coil of the transmitter 2 should be much smaller than the time constant of the plate 1 sets a lower limit to the thickness d which is possible to measure:

$$k\sqrt{LC} < \frac{d^2}{\rho}$$

where the constant k depends on the requirements and properties of the measurement system.

It follows that, in order to lower the measurement limit of the thickness d from 0.5 mm to 0.2 mm, the speed of the turn off of the transmitter 2 current may need to be increased by a factor 6.

Thus, in order to reduce the lower limit of the thickness measurement it may be necessary to increase the speed of the transmitter coil system. This may be done at least partly by reducing the number of turns in the transmitter coil. By reducing the number of turns in the transmitter coil, both the inductance and the effective capacitance can be reduced. However, reducing the number of turns of the transmitter coil also reduces the flux in the object, and the magnitude of the eddy currents in the object 1, and thus the measurement signal, depends on the total flux in the object, just before the current is cut off.

In order to keep up the signal-to-noise ratio of the eddy current measurement while keeping down the number of turns in the transmitter coil, it may therefore be desirable to substantially increase the transmitter current, i.e. the current through the coil of the transmitter 2.

The transmitter topology of the present invention provides a solution adapted for use with high currents and low capacitance by letting the transmitter current run in the same direction in every measurement. This yields a very simple circuit for the transmitter current, which subjects the object/plate 1 to a unipolar magnetization. The large voltage pulse resulting from the transmitter current cut-off, as well as the small signal induced by the decaying eddy currents, will then always have the same polarity. An example embodiment of such a transmitter coil 21 is shown in FIG. 2.

Figure 2:
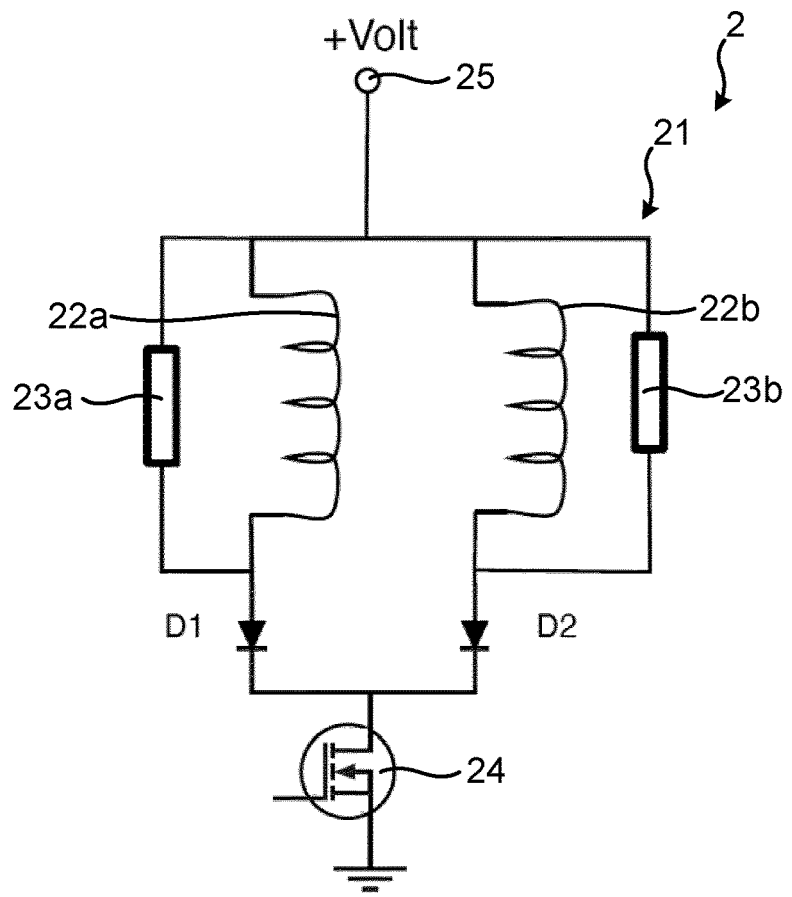
FIG. 2 is a schematic circuit diagram of an embodiment of the transmitter of the present invention.

FIG. 2 the transmitter coil 21 is connected to a voltage source 25 configured for supplying a transmitter current through the transmitter coil. A switching device 24, e.g. comprising a semiconductor switch or a circuit breaker, here a semiconductor switch, preferably a Metal-Oxide-Semiconductor Field-Effect Transistors (MOSFET) e.g. an n-channel MOSFET (also called nMOS), for turning on or off the transmitter current.

The transmitter coil 21 comprises a plurality of parallel electrically conductive coil layers 22, connected in parallel to each other to enable the use of a higher transmitter current while keeping the resistance down. In FIG. 2, two coil layers 22a and 22b are schematically shown, but any number of coil layers, e.g. at least four coil layers, may be comprised in the plurality of coil layers 22 of the transmitter coil 21. A respective damping resistor 23 (here 23a and 23b, respectively) may be connected across each coil layer 22 of the plurality of coil layers for damping the parallel oscillating circuit resulting from the capacitance of the coil. Each of the plurality of coil layers 22 is connected in series with a respective one-way blocking device, typically a diode D, here a diode D1 in series with coil layer 22a and a diode D2 in series with coil layer 22b, for insulating the switching device 24 from the resonance circuit formed in the transmitter coil 21. The plurality of respective diodes D also prevent the formation of a circulating current flowing between the coil layers 22. Otherwise, differences between the different coil layers 22 may result in such a circulating current which may interfere with the measurement of the relatively small eddy currents in the object 1. The transmitter coil 21 preferably uses several layers of a Printable Circuit Board (PCB) for forming the coil layers 22, one PCB layer per coil layer. The coil layers 22 are typically identical to each other. In order to keep the inductance low enough, the number of turns in each of the coil layers may be very low, e.g. within the range of from one to four turns.

Further, by the transmitter coil 21 being unipolar, as a result of the respective diodes D being connected in series with each of the coil layers 22, the transmitter current typically has to be transmitted through only one diode D and only one switching device 24 in series in the transmitter 21, compared with two diodes and two switching devices in series for a conventional bipolar transmitter, reducing the resistance and thermal losses in the transmitter 21. Also, semiconductor switches of the nMOS type may be used in the switching device 24, instead of the higher drain resistance and higher capacitance pMOS type of semiconductor switch. To further minimize the thermal losses in the transmitter, the switching device 24 may comprise or consist of several semiconductor switches connected in parallel.

FIG. 3 illustrates an embodiment of a receiver 3. The receiver 3 comprises a receiver coil 31, in which a receiver current can be formed, induced by the changing electromagnetic field resulting from the cut-off of the transmitter current and then by the decay of the eddy currents in the object 1. The receiver current is output to an RC 33 on which voltage measurements may be made for determining properties of the object 1. However, in order to protect the RC 33 from the relatively very high voltage spike resulting at the time of cut-off of the transmitter current in the transmitter 2, an OVP 32 is connected between the receiver coil 31 and the RC 33. An amplifier 34 may be connected to the RC to facilitate measurement of the relatively low (mV range) voltages therein.

The OVP typically comprises a plurality of semiconductor switches V, e.g. each comprising a MOSFET such as an nMOS or pMOS, preferably nMOS due to the lower drain resistance and lower capacitance compared with a pMOS.

Since the transmitter 2 is unipolar, the receiver current induced in the receiver coil 31 will always be of the same polarity. This allows also the OVP 32 to have a simpler topology compared with when a conventional bipolar transmitter is used. However, it may then be difficult to eliminate offsets within the PEC system 10. Thus, it may be advantageous to use a bipolar OVP 32, allowing the polarity in the RC 33 to be changed between measurements even when using the unipolar transmitter 2. When performing a measurement of a thickness d of an object, such a measurement may comprise two sub-measurements, each with a different polarity in the RC 33 by means of the bipolar OVP 32. In the embodiment of FIG. 3, the OVP is bipolar by means of an H-bridge topology of four semiconductor switches V1, V2, V3 and V4, in this example each comprising an nMOS, which may be a convenient way of making the OVP bipolar.

Further, if an amplifier 34 is used, such an amplifier may have offset voltages which vary over time, which offsets may also be compensated for by means of the sub-measurements at different polarities in the RC 33. As mentioned above, the polarity of the RC 33 may be controlled by means of a bipolar OVP 32. This offset compensation, typically comprising subtraction of the offset enabled by the two sub-measurements, facilitates measurements of the relatively small voltages in the RC 33 in a stable way.

FIG. 4 illustrates some embodiments of the method of the present disclosure. The method is for determining/measuring a thickness d of the object 1 by means of an embodiment of the PEC system 10 of the present disclosure. The method comprises, by means of the transmitter 2, inducing S1 first eddy currents in the object 1. Then, by means of the receiver 3, a first voltage having a first polarity in the RC 33 is measured S2 as a function of time, wherein the first voltage is induced in the receiver coil 31 by the changing electromagnetic field generated by the first eddy currents. Then, the thickness d of the object 1 is determined S5 based on the measurement S2 of the first voltage.

In some embodiments, the method also comprises, prior to the determining S5 of the thickness d, inducing S3 second eddy currents in the object 1 by means of the transmitter 2. Then, a second voltage having a second polarity, opposite to the first polarity, may be measured S4 as a function of time in the RC 33 by means of the receiver 3. In this embodiment, the second voltage is induced in the receiver coil 31 by the changing electromagnetic field generated by the second eddy currents and the polarity of the voltage in the RC 33 is controlled by the OVP 32 which is bipolar. Then, the determining S5 of the thickness d may be based on both the measurement S2 of the first voltage and the measurement S4 of the second voltage. Offsets may thus be subtracted.

In some embodiments of the present invention, the OVP 32 is bipolar. This may be a convenient way to allow measurements in the RC 33 at different polarities, e.g. to compensate for offsets, when using the unipolar transmitter 2 of the present disclosure. In some embodiments, the OVP 32 is bipolar by means of an H-bridge topology. In some embodiments, the H-bridge topology is formed by four MOSFET V, e.g. n-channel MOSFET:s (also called nMOS herein).

In some embodiments of the present invention, the RC 33 is connected to an amplifier 34 comprised in the receiver 3. This may facilitate and improve the measurement S2 and/or S4 of the relatively small induced voltages in the RC.

In some embodiments of the present invention, the switching device 24 of the transmitter 2 is or comprises a MOSFET, e.g. an n-channel MOSFET (also called nMOS herein). Thus, both the switching device 24 of the transmitter 2 and the semiconductor switches V of the OVP 32 may conveniently comprise a respective nMOS.

In some embodiments of the present invention, the object 1 is a plate or sheet metal, e.g. fed to the PEC system 10 from a roll and/or rolled-up on a roll after having passed the PEC system 10.

Some embodiments of the PEC system 10 may be especially useful for determining small thicknesses of the object 1, e.g. a thickness d of less than 0.5 mm such as within the range of from 0.5 mm to 0.2 mm, e.g. from 0.4 mm to 0.2 mm.

FIG. 5 schematically illustrates an embodiment of the controller 6 of the present disclosure. The controller 6 comprises processing circuitry 61 e.g. a central processing unit (CPU). The processing circuitry 61 may comprise one or a plurality of processing units in the form of microprocessor(s). However, other suitable devices with computing capabilities could be comprised in the processing circuitry 61, e.g. an application specific integrated circuit (ASIC), a field programmable gate array (FPGA) or a complex programmable logic device (CPLD). The processing circuitry 61 is configured to run one or several computer program(s) or software (SW) 63 stored in a storage 62 of one or several storage unit(s) e.g. a memory. The storage unit is regarded as a computer readable means, forming a computer program product 62 together with the SW 63 stored thereon as computer-executable components, as discussed herein and may e.g. be in the form of a Random Access Memory (RAM), a Flash memory or other solid state memory, or a hard disk, or be a combination thereof. The processing circuitry 61 may also be configured to store data in the storage 62, as needed. The controller 6 may be configured to perform the method of the present disclosure.

The present disclosure has mainly been described above with reference to a few embodiments. However, as is readily appreciated by a person skilled in the art, other embodiments than the ones disclosed above are equally possible within the scope of the present disclosure, as defined by the appended claims.

The invention claimed is:

1. A transmitter for a Pulsed Eddy Current, PEC, system, configured to generate a changing electromagnetic field which induces eddy currents in an object of an electrically conductive material arranged within the electromagnetic field, the transmitter comprising a switching device and a transmitter coil configured to be connected to a voltage source, the switching device being arranged for switching a current generated by the voltage source through the transmitter coil, wherein the transmitter coil includes a plurality of parallel electrically conductive coil layers, connected in parallel to each other, with a respective damping resistor connected across each of the coil layers, each of the coil layers being connected in series with a respective diode.

2. The transmitter of claim 1, wherein the switching device is or includes a MOSFET.

3. A PEC system comprising:
 a transmitter configured to generate a changing electromagnetic field which induces eddy currents in an object of an electrically conductive material arranged within the electromagnetic field, the transmitter having a switching device and a transmitter coil configured to be connected to a voltage source, the switching device being arranged for switching a current generated by the voltage source through the transmitter coil, wherein the transmitter coil includes a plurality of parallel electrically conductive coil layers, connected in parallel to each other, with a respective damping resistor connected across each of the coil layers, each of the coil layers being connected in series with a respective diode; and
 a receiver configured to detect a changing electromagnetic field generated by the eddy currents, the receiver having an electrically conductive receiver coil, a Receiver Channel, RC, and an Over-Voltage Protection circuit, OVP, connected between the receiver coil and the RC.

4. The PEC system of claim 3, wherein the OVP is bipolar.

5. The PEC system of claim 4, wherein the OVP is bipolar by means of an H-bridge topology.

6. The PEC system of claim 5, wherein the H-bridge topology is formed by four Metal-Oxide-Semiconductor Field-Effect Transistors, MOSFET.

7. The PEC system of claim 3, wherein the RC is connected to an amplifier included in the receiver.

8. The PEC system of claim 3 wherein the switching device is or includes a MOSFET.

9. A method of determining a thickness of an object by means of a PEC system which includes a transmitter configured to generate a changing electromagnetic field which induces eddy currents in an object of an electrically conductive material arranged within the electromagnetic field, the transmitter having a switching device and a transmitter coil configured to be connected to a voltage source, the switching device being arranged for switching a current generated by the voltage source through the transmitter coil, wherein the transmitter coil includes a plurality of parallel electrically conductive coil layers, connected in parallel to each other, with a respective damping resistor connected across each of the coil layers, each of the coil layers being connected in series with a respective diode, and a receiver configured to detect a changing electromagnetic field generated by the eddy currents, the receiver having an electrically conductive receiver coil, a Receiver Channel, RC, and an Over-Voltage Protection circuit, OVP, connected between the receiver coil and the RC, the method comprising:
 by means of the transmitter, inducing first eddy currents in the object;
 by means of the receiver, as a function of time, measuring a first voltage having a first polarity in the RC, wherein the first voltage is induced in the receiver coil by a changing electromagnetic field generated by first eddy currents; and
 based on the measurement of the first voltage, determining the thickness of the object.

10. The method of claim 9, further comprising:
 by means of the transmitter, inducing second eddy currents in the object; and
 by means of the receiver, as a function of time, measuring a second voltage having a second polarity, opposite to the first polarity, in the RC, wherein the second voltage is induced in the receiver coil by the changing electromagnetic field generated by the second eddy currents and the polarity of the voltage in the RC is controlled by the OVP which is bipolar;
 wherein the determining is based on both the measurement of the first voltage and the measurement of the second voltage.

11. The method of claim 9, wherein the object is a plate.

12. The method of claim 9, wherein the thickness is within the range of from 0.5 mm to 0.2 mm.

13. The method of claim 9 wherein the RC is connected to an amplifier included in the receiver.

14. The method of claim 9, wherein the object is a plate.

15. The method of claim 9, wherein the thickness is within the range of from 0.5 mm to 0.2 mm.

16. A non-transitory computer readable storage medium comprising instructions stored therein for causing a controller of a PEC system to perform a method of determining a thickness of an object, the PEC including a transmitter configured to generate a changing electromagnetic field which induces eddy currents in an object of an electrically conductive material arranged within the electromagnetic field, the transmitter having a switching device and a transmitter coil configured to be connected to a voltage source, the switching device being arranged for switching a current generated by the voltage source through the transmitter coil, wherein the transmitter coil includes a plurality of parallel electrically conductive coil layers, connected in parallel to each other, with a respective damping resistor connected across each of the coil layers, each of the coil layers being connected in series with a respective diode, and a receiver configured to detect a changing electromagnetic field generated by the eddy currents, the receiver having an electrically conductive receiver coil, a Receiver Channel, RC, and an Over-Voltage Protection circuit, OVP, connected between the receiver coil and the RC, wherein the method includes the steps:

by means of the transmitter, inducing first eddy currents in the object;

by means of the receiver, as a function of time, measuring a first voltage having a first polarity in the RC, wherein the first voltage is induced in the receiver coil by a changing electromagnetic field generated by first eddy currents; and based on the measurement of the first voltage, determining the thickness of the object.

\* \* \* \* \*